Jan. 9, 1968   R. S. KAFKA   3,362,336
WAVE MOTION OPERATED DEVICE
Filed Oct. 23, 1965   2 Sheets-Sheet 1
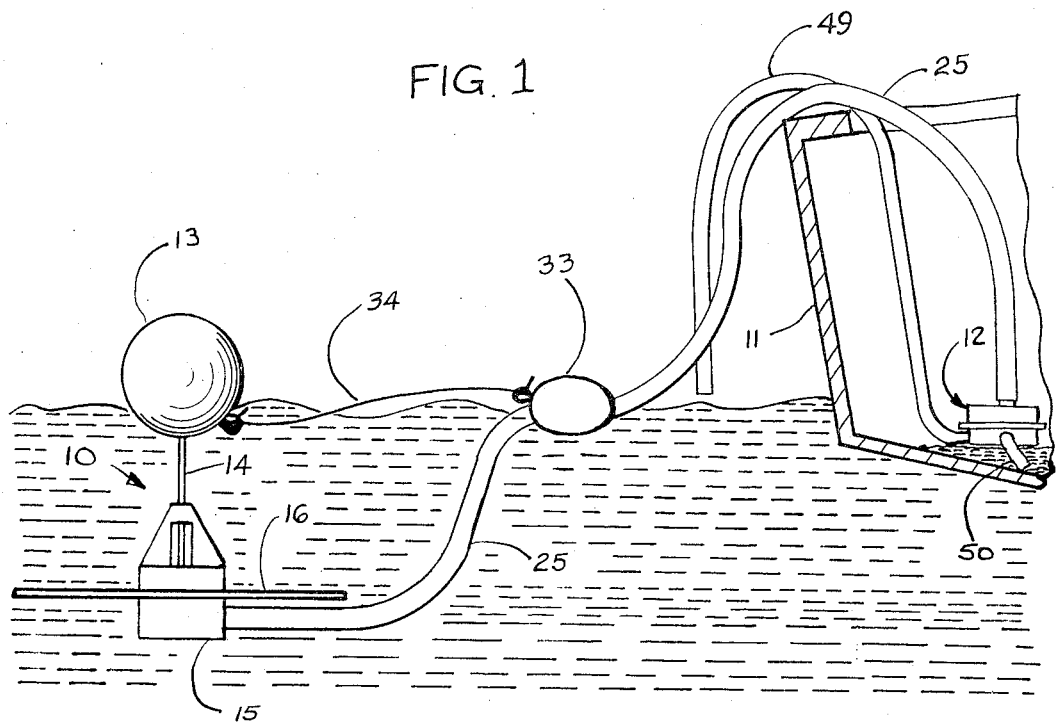
FIG. 1
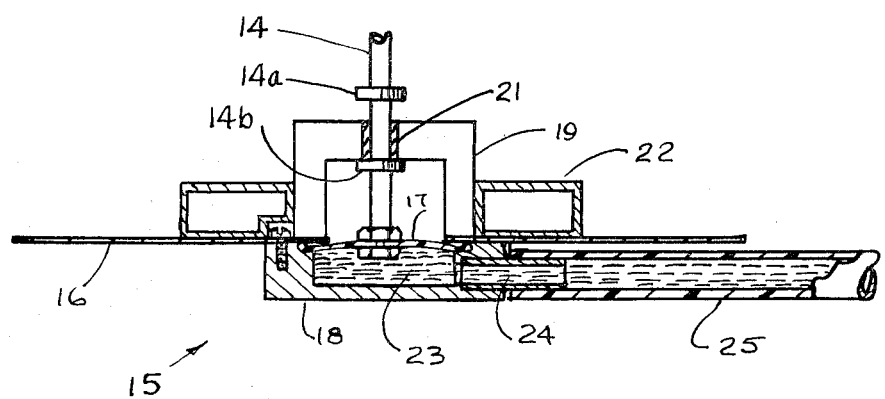
FIG. 2   ROBERT S. KAFKA   INVENTOR
BY *Julian C. Renfro*
ATTORNEY

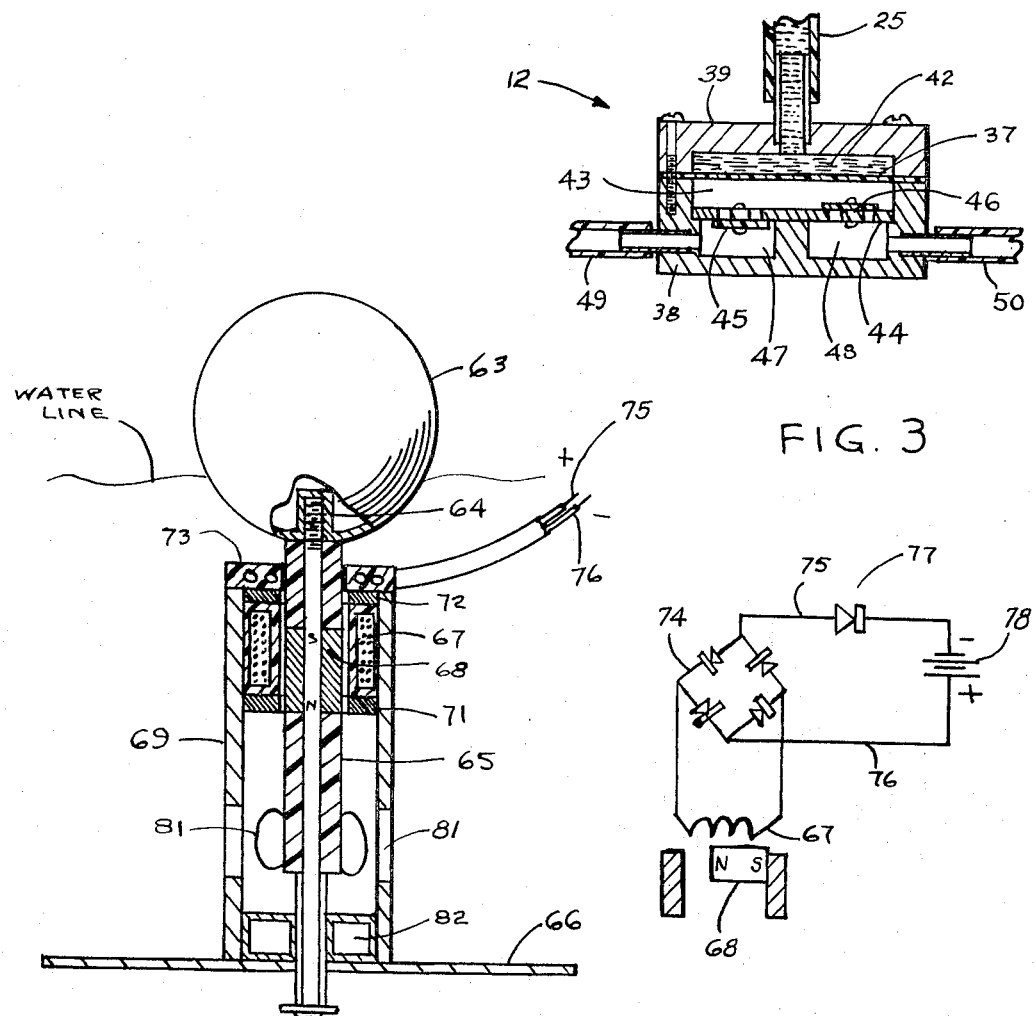

United States Patent Office 3,362,336
Patented Jan. 9, 1968

3,362,336
WAVE MOTION OPERATED DEVICE
Robert S. Kafka, 9 East Wind Lane,
Maitland, Fla. 32751
Filed Oct. 23, 1965, Ser. No. 503,487
7 Claims. (Cl. 103—44)

ABSTRACT OF THE DISCLOSURE

This invention relates to a two component device for utilizing wave motion to achieve a pumping action, being adapted to pump out the bilge of a boat or the like, and consisting of a float unit and a pump unit. The float unit is freely floating and equipped at a submerged location with a substantially horizontally disposed member of considerable area, such that the float unit is substantially less affected by wave action than is a float, movably attached to the upper portion of such device. Motion of the float with respect to the rest of the float unit brings about motion of a diaphragm disposed as part of a suitable pumping chamber in the float unit. A hose or other conduit attaches this pumping chamber of the float unit to the pump unit, and at latter location actuates a diaphragm pump that is responsible for removing water from the bilge of the boat and dumping it overboard. Another embodiment of my invention utilizes no diaphragm, but rather involves the use of an electric power generating arrangement in which wave motion causes the generation of current which can be rectified, and thereafter used for recharging batteries.

This invention relates to a device for extracting energy from a liquid surface having wave motion, and more particularly to such a device of which one embodiment involves a wave-operated actuator arrangement utilized in concert with a pump unit disposed in a bilge portion of a boat or the like for bringing about an automatic removal of the water accumulating in the bilge, whereas another embodiment of this invention involves a wave operated electric generating arrangement capable of being utilized for recharging a battery.

In the past a number of wave motion operated devices have been proposed, but these have been characterized by their complexity and cost. Such prior art devices have typically involved carefully fitted piston and cylinder arrangements, pulley and chain arrangements, flotation chambers, elaborate pumps and the like but because of such expense and complexity, few of these devices have ever reached the market.

The present invention in a manner generally similar to some of these prior art devices is designed to harness in a useful manner the relatively inexhaustible energy contained in wave motion, but proceeds in a much more logical and practical manner to bring this about. Instead of attempting the employment of a large submerged or partially submerged device connected by lines, hoses, brackets, or wires to the boat to be bailed or the battery to be charged, in accordance with a primary embodiment I instead provide a pair of related pumping units connected only by a single hose, with one of these units being a float unit or actuator unit disposed on or near the surface of the water and the other unit being disposed, for example, in the bottom of the boat to be bailed. Both of these units are equipped with diaphragms defining at least one chamber in each device, with the diaphragm of the water-borne device having connected to a central portion thereof a vertically disposed rod that is attached at its upper end to a float adapted to move up and down in accordance with wave action. A desirable amount of relative motion is assured by virtue of the use with the chamber of the water-borne device of a comparatively large submerged plate of nearly neutral buoyancy. The float-actuated diaphragm forms a sealed chamber that is connected by tubing, hose or the like to a first chamber of the unit located in the boat. A sealed relationship therefore exists between these chambers of the two units such that when the wave action causes the float of the actuator unit to move up and down relatively with respect to the submerged chamber thereof, the ensuing diaphragm motions of the float unit or actuator unit will be transferred to the diaphragm of the unit in the boat. The second chamber in the boat-borne unit is equipped with a suitable opening for the entrance of bilge water, as well as a one-way valve for controlling such opening. In this manner, as the diaphragm of the boat unit is pulled one direction by reduced pressure thereabove, an increment of bilge water is pulled into the second chamber, where it is trapped and thereafter expelled through a suitable outlet during subsequent diaphragm movement in the opposite direction. Latter outlet, also equipped with a one-way valve, is connected with this second chamber and arranged by means of a length of tubing to carry the bilge water thus pumped over the side of the boat.

Another facet of my invention entails an embodiment involving a float unit in which no diaphragm is used, but rather a permanent magnet is arranged to be driven by the vertical motions of the rod that is disposed between a float and a submerged unit stabilized by a large submerged plate, which motions of course take place as a wave causes relative motion between the submerged plate and the float. The permanent magnet is mounted so as to be moved between upper and lower positions with respect to a suitable electric coil. As will be understood, rapid movements of the magnet with respect to the coil will cause current to be generated, such rapid movements being assured as a result of the use of a detenting action that will not allow the magnet to move unless a wave impulse is sufficient to overcome such bias. When magnet motion does take place, however, the energy generated in the coil is sufficient so that when it is passed through a full wave rectifier, a sufficient flow of direct current will thereafter take place to create a battery recharging pulse overcoming the back electromotive force (EMF) of the battery. These and other objects, features and advantages will be more apparent from a study of the drawings in which:

FIGURE 1 is an overall view of the primary embodiment of my invention, with portions of the drawing being in section so as to reveal certain details;

FIGURE 2 is a cross sectional view to a somewhat larger scale of the actuator portion of the float unit;

FIGURE 3 is a cross sectional view revealing significant details of the pump unit;

FIGURE 4 is a cross sectional view of the secondary embodiment of my invention, involving the generation of electricity by wave action; and FIGURE 5 is a schematic view of the wiring arrangement associated with FIGURE 4.

Turning to FIGURE 1, a preferred embodiment will be seen, involving a float unit 10, which is adapted to be disposed in the water adjacent a moored boat 11 so as to bring about an automatic pumping action sufficient for the operation of bilge pumping unit 12, so that latter unit can remove undesired water from the bottom of the boat.

As may be observed, float unit 10 utilizes a float device 13, such as a hollow ball of plastic or the like, to the lower side of which is attached a vertically disposed rod 14. Rod 14 in turn is operatively received in the actuator portion 15 that is supported by the float a suitable distance below the level of the water. As will be noted from FIGURES 1 and 2, the actuator portion 15 utilizes an inertia plate 16 of substantial area, the configuration of which may be round, square or some other shape as may be desired. The important factor is that inertia plate 16 should maintain the unit 15 as stationary as possible despite wave activity and the motion of float 13.

The motion of float 13 with respect to actuator unit 15 is utilized in accordance with this invention to bring about a pumping action that will bring about the removal of undesired water from the bilge of the boat 11. To that end, the lower end of rod 14 is secured to a central portion of diaphragm 17, so that the motion of the rod 14 can be utilized. In the illustrated example, the diaphragm 17 is of circular configuration having a rolled edge or some other form of gasketing means. The periphery of this diaphragm is secured between the underside of inertia plate 16 and pump housing 18, with a number of circumferentially spaced bolts being employed for securing the pump housing and the inertia plate together tightly enough to create a sealed chamber 23 below the diaphragm 17.

The upper portion 19 of the float unit may form a suitable sliding guide for the movements of rod 14, and this member 19 preferably is welded to plate 16, with bearing material 21 therein serving as a low friction means so that binding between the rod and the pump housing will not occur. Upper and lower collars 14a and 14b protect the diaphragm by preventing an inordinate motion of rod 14 which of course might damage the diaphragm.

Although float 13 might well serve to keep the actuator unit at a desirable location with respect to the surface of the water, I nevertheless prefer to use a toroidally shaped flotation chamber 22 surrounding the upper member 19. The chamber 22 is typically filled with air and is of such a volume as to keep the flotation unit 10 at approximately a neutral buoyancy condition.

The construction of member 19 is such that the water in which the actuator unit is submerged can contact the upper surface of diaphragm 17, but below this diaphragm a single principal chamber is defined, which is sealed except for outlet 24, to which outlet hose 25 is attached. As will therefore be seen, as the rod 14 is repeatedly moved by wave action between the positions permitted by collars 14a and 14b, the volumetric size of pumping chamber 23 is caused to vary considerably. This of course brings about a considerable flow of fluid in and out of outlet 24, therefore in effect creating a column of fluid having considerable pulsating motion, which motion is of course utilized in pumping unit 12 in a manner described in greater detail hereinafter.

For some installations I prefer the use of a secondary float 33 which is connected by a lanyard 34 to a lower portion of float 13. Float 33 may have an opening therethrough, through which the hose 25 may pass in tight-fitting relation. Hose 25 is fairly flexible and in conjunction with lanyard 34 forms a type of halter arrangement to prevent any substantial tipping of the unit 10 away from the vertical position illustrated, despite a considerable amount of current or wave motion.

The other end of hose 25 is connected to pump unit 12, preferably to the upper central portion of such unit. As seen in FIGURE 3, latter unit is furnished with a diaphragm 37 that in effect divides the unit 12 into upper and lower principal chambers 42 and 43, respectively. However, unlike the construction of actuator unit 15, two chambers 42 and 43 are created, each of which are sealed chambers, except for openings to be hereinafter described, such sealing being effected by the use of tightly fitting lower and upper housing members 38 and 39, which are held together by a closely spaced series of machine screws or the like. Preferably the upper and lower housing units as well as the diaphragm are circular, but this of course is not a requirement, the only requirement being that a proper fit between the diaphragm and the housing members is assured.

Generally circular valve plate 44 is disposed at approximately a midportion of the lower housing member 38 and on this plate are installed a pair of one way valves 45 and 46. These valves may be of rubber or other resilient material, the central portion of which is secured to valve plate 44, and the peripheral portions of which normally cover a series of holes disposed in the valve plate 44, that are grouped within the perimeter of the discs. Chambers 47 and 48 are disposed beneath valve discs 45 and 46, respectively, and upon a suitable differential in pressure existing between these chambers and the chamber 43, these valves are caused to operate, as will now be set forth.

More specifically, valve 45 is disposed on the underside of plate 44 so that if a higher pressure exists in chamber 43 than in chamber 47, such as during a down stroke of diaphragm 37, the valve 45 is caused to open and admit the flow of water into chamber 47 and thence into outlet tube 49. On the other hand, because valve 46 is disposed above plate 44, a higher pressure in chamber 43 does not cause a flow into chamber 48, but on the other hand if the pressure in chamber 43 is lowered, such as due to diaphragm 37 being caused to rise, a flow of water from chamber 48 into chamber 43 can take place, such water of course coming from bilge tube 50.

As to the operation of this first embodiment of my invention, upon relative motion taking place between the float 13 and the actuator unit 15, the diaphragm 17 is caused to create rather substantial pulsating motion in the water in hose or tube 25 interconnecting the pump unit and the unit 12. This motion of course has a direct effect upon the diaphragm 37, this latter diaphragm moving up as the diaphragm 17 moves up, and moving down as the diaphragm 17 moves down. As a result, water in tube 50 is drawn into chamber 48 as diaphragm 37 moves up, this flow of course taking place through the holes normally covered by valve 46, which valve disc is of course pushed aside during a differential in pressure of this type.

As a result of subsequent downward motion of diaphragm 37, the water now residing in chamber 43 is forced through the holes associated with valve member 45, such water entering chamber 47 and thereafter tube 49, from which it passes over the side of the boat into the water. Needless to say, water in chamber 43 is not pushed back into tube 50 during downward diaphragm movements inasmuch as the one-way valve 46 prevents this. Similarly, one-way valve 45 prevents water from outlet tube 49 being caused to reenter chamber 43 during upward diaphragm movements. As will therefore be seen, this embodiment of my invention brings about a rather substantial pumping action as a result of wave motion.

Turning to the embodiment depicted in FIGURE 4, it will be seen that float 63 is attached by rod 64 to an armature 65 that is movable within submerged housing 69. Armature 65 is made of alternate sections of metal, and of plastic, for example with the metal portion 68 being a permanent magnet such as Alnico disposed so as to move back and forth within coil 67 as wave action causes relative motion between float 63 and inertia plate 66. Because portion 68 is of such suitable material, a desirable flow of electric current is created in the windings of waterproofed coil 67 as a result of such wave action.

Winding 67 is defined in its upper and lower extremes by plates 71 and 72, which are of magnetically attractable material. Member 68 in effect is a magnet having polarities as shown in FIGURE 4, and as a result of the construction just described, the magnet 68 either resides alongside metal plate 71 or plate 72. The arrangement is such that the magnet desirably can be moved only as a result of fairly substantial wave action, and then only between the lower position illustrated in FIGURE 4 in which one pole is adjacent plate 71, and an upper position in which the opposite pole is adjacent plate 72.

Just above plate 72 the electrical components schematically illustrated in FIGURE 5 are disposed in a potted arrangement 73 which renders such components waterproof and leading from this component 73, leads 75 and 76 deliver current to appropriate terminals of a battery.

With reference to FIGURE 5, it will be understood that magnet 68 is movable to a limited extent with respect to winding 67, with the output leads of such winding being connected to appropriate terminals of full wave rectifier 74 which, as previously mentioned, are encapsulated into unit 73. Output leads 75 and 76 from the full wave rectifier are connected to battery 78 to bring about the charging thereof, with diode 77 being disposed to prevent an undesired backflow of current from the battery into the rectifier.

A plurality of holes 81 may be disposed about the lower portion of housing 69 for the free entry of sea water, thus to prevent a pumping action by the armature 65 which would be undesirable in this embodiment. However, a desirable amount of buoyancy can be created by flotation chamber 82, which, like its counterpart 22 in FIGURE 2, causes the submerged portion of the embodiment of FIGURE 4 to be approximately neutrally buoyant.

As will now be apparent, this second embodiment of my invention can very effectively harness wave action for bringing about a desirable recharging of a boat battery or the like with a minimum of expense being involved both in the original selling price of the unit and in the maintenance of the unit.

Other embodiments of my invention and constructions other than those set forth herein will be obvious to those skilled in the art, and I am not to be limited thereto except as required by the scope of the appended claims.

I claim:

1. A non-anchored, freely floating device for extracting energy from a liquid surface having wave motion comprising a float member designed to float adjacent the surface of the liquid, a vertically disposed rod attached to said float member and extending therebelow so as to form at least a portion of the support for a submerged unit, said submerged unit being equipped with a substantially horizontally disposed member of considerable area which, because of its disposition below the surface of the liquid is substantially less effected by wave motion than is said float member, said rod therefore being moved by wave motion relative to said submerged unit, and means operated by such motion of said rod for providing a useful output of energy.

2. The energy extracting device as defined in claim 1 in which said means for providing an energy output is a diaphragm to which said rod is attached, said diaphragm having motion as a result of the movements of said rod, said diaphragm forming a part of a sealed chamber having an outlet, said diaphragm movements forming pulsations at said outlet that are usable at a remote location to provide a pumping action.

3. The energy extracting device as defined in claim 2 in conjunction with a device in a remote location in the form of a dual chambered unit whose chambers are separated by a movable diaphragm, means interconnecting said outlet of said sealed chamber with one of the chambers of said dual chambered unit whereby the diaphragm motions of said submerged unit cause similar motion of the second mentioned diaphragm, and valve-operated inlet and outlet means associated with the other of said chambers of said dual chambered unit so that as a result of such diaphragm motions, a pumping of liquid can be effected.

4. The energy extracting device defined in claim 1 in which said energy supplying means is in the form of a magnet attached to said vertically removable rod, said magnet being movable between alternate positions within a toroidally shaped electric coil, said magnet motions causing current to be generated in said coil, and rectifier means associated with said coil so that direct current can be provided.

5. The energy extracting device as defined in claim 4 in which said movable magnet is utilized in connection with a detent arrangement at each alternate position of said magnet, whereby the motions of said magnet in said coil are rapid.

6. A non-anchored freely floating wave actuated pumping device for removing undesired water from the bilge of a moored boat or the like comprising a float unit and a pump unit, said float unit and said pump unit each comprising a housing in which a pumping means is operably disposed, the pumping means in said float unit defining with respect to its housing a single principal chamber, and the pumping means in said pump unit defining a pair of chambers, a float device associated with said float unit, and being adapted to remain on the surface of a body of water so as to be affected by wave action, said float unit being adapted to remain somewhat under the surface of the water, means attached to a submerged portion of said float unit, and presenting considerable area, which means, because of its disposition below the surface of the water, is considerably less affected by wave motion than is said float, and elongated rod extending between said float and said pumping means of said float unit so that the relative motion occurring between said float and said float unit as a result of wave action will cause a desirable amount of motion of said pumping means, latter means being an integral portion of said principal chamber, which chamber contains an outlet port, means interconnecting said port and a first chamber of said pump unit, whereby the motion of the first mentioned pumping means will cause similar motion of the second mentioned pumping means, and valve means associated with the second chamber of said pump unit so that as a result of such pumping motions a pumping of bilge water can be effected.

7. The wave actuated pumping device as defined in claim 6 in which said pumping means in said float unit and in said pump unit are each a diaphragm.

References Cited
UNITED STATES PATENTS

| | | | |
|---|---|---|---|
| 628,457 | 7/1899 | Gehre | 290—42 |
| 862,867 | 8/1907 | Eggleston. | |
| 1,101,266 | 6/1914 | Franklin. | |
| 3,126,830 | 3/1964 | Dilliner | 103—68 |

ROBERT M. WALKER, *Primary Examiner.*